(12) United States Patent
Mukherjee et al.

(10) Patent No.: US 10,469,769 B1
(45) Date of Patent: Nov. 5, 2019

(54) AUGMENTED REALITY BASED DRIVER ASSISTANCE

(71) Applicant: International Business Machines Corporation, Armonk, NY (US)

(72) Inventors: Maharaj Mukherjee, Poughkeepsie, NY (US); Shikhar Kwatra, Durham, NC (US); Farrokh Pourmirzaie, San Jose, CA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/048,476

(22) Filed: Jul. 30, 2018

(51) Int. Cl.
*H04N 5/272* (2006.01)
*B60R 1/00* (2006.01)
*G06T 11/60* (2006.01)

(52) U.S. Cl.
CPC .............. *H04N 5/272* (2013.01); *B60R 1/002* (2013.01); *G06T 11/60* (2013.01); *B60R 2300/20* (2013.01); *B60R 2300/304* (2013.01)

(58) Field of Classification Search
CPC .............. H04N 5/272; B60R 2300/304; B60R 2300/20; B60R 1/002; G06T 11/60
See application file for complete search history.

(56) References Cited

U.S. PATENT DOCUMENTS

| 7,561,966 B2 | 7/2009 | Nakamura et al. | |
| 8,947,219 B2 * | 2/2015 | Popovic | B60Q 9/008 340/438 |
| 2009/0312888 A1 | 12/2009 | Sickert et al. | |
| 2010/0253594 A1 | 10/2010 | Szczerba et al. | |
| 2011/0153198 A1 | 6/2011 | Kokkas et al. | |
| 2012/0002027 A1 * | 1/2012 | Takahashi | B60K 28/066 348/77 |
| 2012/0139816 A1 | 6/2012 | King et al. | |
| 2013/0083063 A1 | 4/2013 | Geisner et al. | |
| 2016/0207457 A1 | 7/2016 | Border et al. | |
| 2017/0269684 A1 | 9/2017 | Murai | |
| 2018/0099679 A1 * | 4/2018 | Huang | B60W 50/14 |

FOREIGN PATENT DOCUMENTS

| CN | 103802728 B | 3/2016 |
| CN | 103177470 B | 12/2016 |
| DE | 102009045169 A1 | 3/2011 |
| KR | 1020120018690 A | 3/2012 |
| WO | 2015155029 A1 | 10/2015 |

OTHER PUBLICATIONS

Mell et al., "The NIST Definition of Cloud Computing", Recommendations of the National Institute of Standards and Technology, Sep. 2011, 7 pages.

* cited by examiner

Primary Examiner — Oschta I Montoya
(74) Attorney, Agent, or Firm — Stosch Sabo

(57) ABSTRACT

A head mounted display (HMD) device worn by a user in a vehicular computing environment (VCE) can be augmented with video by measuring, within the VCE, a sight angle between a user's directional focus and a vehicle's directional orientation and augmenting, in response to a determination that the measured sight angle exceeds a threshold limit, an interface of the HMD device with a video feed of continuous live content captured within a central viewing area.

7 Claims, 9 Drawing Sheets

AUGMENTED REALITY BASED DRIVER ASSISTANCE

BACKGROUND

The present disclosure relates to augmenting reality, and more specifically, to augmenting reality throughout a vehicular computing environment.

Augmented Reality (AR) seamlessly interweaves computer-generated perceptual information across sensory modalities (e.g., visual, auditory, haptic, somatosensory, and olfactory, etc.) of a real-world environment into a user device (e.g., head-mounted display (HMD) device, heads-up display (HUD) device, smart contact lenses, etc.) for display.

SUMMARY

Aspects of the present disclosure are directed to a method for augmenting video to a head mounted display (HMD) device worn by a user in a vehicular computing environment (VCE). The method can comprise measuring, within the VCE, a sight angle between a user's directional focus and a vehicle's directional orientation. Lastly, the method can comprise augmenting, in response to a determination that the measured sight angle exceeds a threshold limit, an interface of the HMD device with a video feed of continuous live content captured within a central viewing area.

Aspects of the present disclosure are further directed to a system comprising a head mounted display (HMD) device worn by a user in a vehicular computing environment (VCE). The system can further comprise a computer readable storage medium storing a corpus of data and a user interface configured to receive input and present output. The system can additionally comprise a processor communicatively coupled to the computer readable storage medium and the user interface and having a memory comprising instructions. When executed by the processor, the instructions can be configured to measure, within the VCE, a sight angle between a user's directional focus and a vehicle's directional orientation. Lastly, the instructions can further be configured to augment, in response to a determination that the measured sight angle exceeds a threshold limit, an interface of the HMD device with a video feed of continuous live content captured within a central viewing area.

Aspects of the present disclosure are further directed to a computer program product for augmenting video to a head mounted display (HMD) device worn by a user in a vehicular computing environment (VCE). The computer program product can comprise a computer readable storage medium having program instructions embodied therewith. The program instructions can cause a processor to measure, within the VCE, a sight angle between a user's directional focus and a vehicle's directional orientation. Lastly, the program instructions can cause the processor to augment, in response to a determination that the measured sight angle exceeds a threshold limit, an interface of the HMD device with a video feed of continuous live content captured within a central viewing area.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
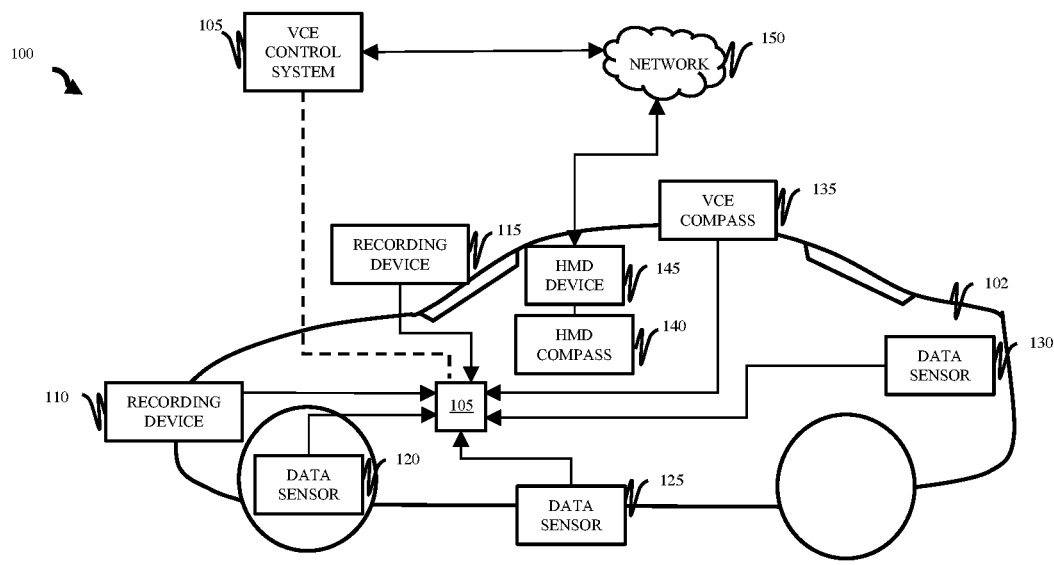
FIG. 1 is a diagrammatic depiction illustrating an example vehicular computing system, in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure are directed towards AR technologies, and more specifically, to augmenting reality throughout a vehicular computing environment (VCE). While the present disclosure is not necessarily limited to such applications, various aspects of the present disclosure can be appreciated through a discussion of various examples using this context.

AR technologies can be deployed through a network of physical devices generating and sharing data. Physical devices can be, but are not limited to, information processing devices (e.g., computers, laptops, desktops, satellites, etc.), transportation devices (e.g., vehicles, busses, trains, planes, etc.), home devices (e.g., security controls, etc.), consumer devices (e.g., mobile phones, tablets, handheld devices, wearable devices, etc.), manufacturing devices (e.g., 3D printers, etc.), and other devices having electronics, hardware, software, sensors, actuators, and/or network connectivity.

AR has applications in many industries such as, but not limited to, manufacturing (e.g., automation, process control, quality control, etc.), utilities (e.g., smart grids, power management, etc.), transportation (e.g., autonomous vehicles, traffic control, etc.), consumer (e.g., smart homes, etc.), defense (e.g., surveillance, security, etc.), healthcare (e.g., health monitoring, etc.), and so on.

Aspects of the present disclosure are further directed towards augmenting reality to mitigate distracted driving while operating (e.g., driving, etc.) within the vehicular computing environment. In the vehicular computing environment, it can be difficult for a user (e.g., driver, etc.) to safely navigate a vehicle during one or more focus shifts. A focus shift refers to a user's directional focus (e.g., line of sight) deviating by a measured sight angle beyond a threshold limit.

In embodiments, a focus shifts can indicate, at a definitive point throughout vehicular operations, a break in the attention span of the user or a period of distracted driving (e.g., sending a text message, etc.). Focus shifts affect the user's ability to safely navigate a vehicle and can occur in response to viewing distractions (e.g., looking out the driver side window, looking at a billboard, roadside activity, etc.), communicating distractions (e.g., talking with a passenger, speaking on a mobile device, etc.) and/or adjusting distractions (e.g., shifting gears, turning the sound dial, closing a window, etc.) within the vehicular computing environment. Focus shifts can increase the probability of an accident occurrence and/or decrease the user's ability to perform precautionary measures.

Figure 4:
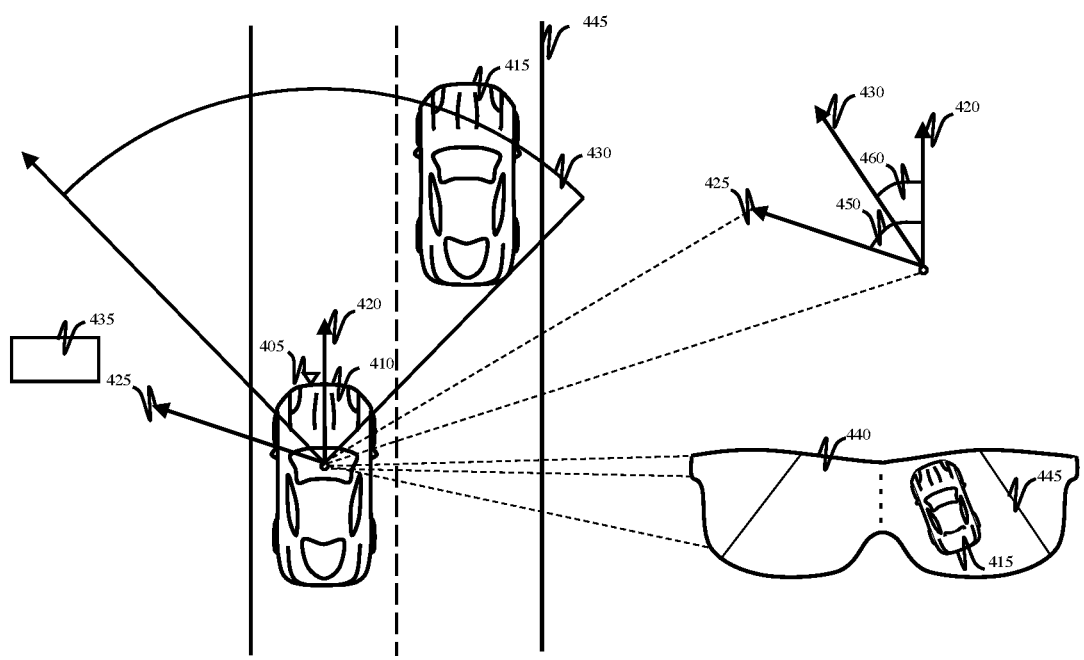
FIG. 4 is a diagrammatic depiction illustrating an example display augmentation of a central viewing area when a measured sight angle exceeds a threshold limit, in accordance with embodiments of the present disclosure.

In embodiments, a central viewing area can comprise the users angular field of view, observable without a focus shift (visually described in more detail with respect to FIG. 4). More specifically, the central viewing area is determined based on a vehicle's directional orientation. The vehicle's directional orientation can refer to the path the vehicle will travel relative to its position in space. Thus, the central viewing area can comprise a pre-set viewing window (e.g., area of space, etc.) in front of the vehicle, comprising the projected driving path of the vehicle.

Figure 5:
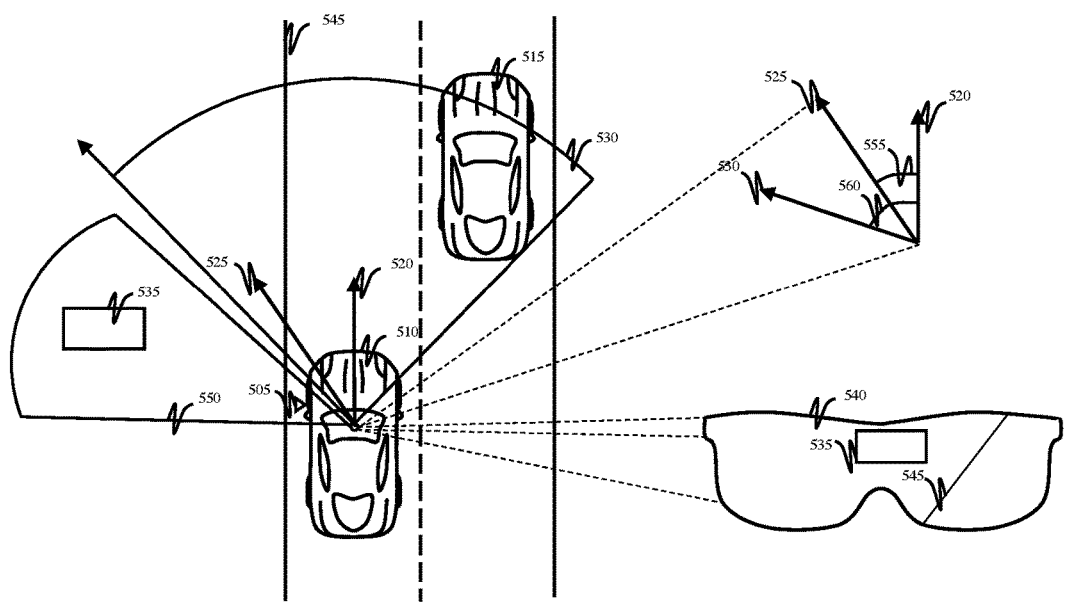
FIG. 5 is a diagrammatic depiction illustrating an example display augmentation of a peripheral viewing area when a measured sight angle is within a threshold limit, in accordance with embodiments of the present disclosure.

Conversely, a peripheral viewing area can extend the central viewing area and comprise the user's angular field of view surrounding the environment of the central viewing area, observable by a focus shift, (visually described in more detail with respect to FIG. 5). The peripheral viewing area can overlap into the central viewing area, exists at the boundary of the central viewing area, or independently comprise an area of view beyond the central viewing area. In embodiments, the central viewing area can comprise a boundary, configured by the VCE, representing an angular environment in front of the vehicle.

In embodiments, the threshold limit can be an angular limit pre-set by a user (e.g., driver, government agency, etc.) at a set degree value. In alternative embodiments, the threshold limit can be a configured angular limit prior to vehicular operations. The threshold limit represents the maximum deviation angle the measured sight angle can deviate before a focus shift occurrence.

In embodiments, the measured sight angle can represent the angle between the user's directional focus relative to the vehicle's directional orientation. Further, augmenting into a display interface of a HMD device is based upon a determination between the deviation of the measured sight angle compared to the threshold limit.

By augmenting the display interface of the HMD device with content comprised within the central viewing area (e.g., desired driving path, etc.) and/or content comprised within the peripheral viewing area, in accordance with embodiments of the present disclosure, the user can detect, avoid, and prevent future accidents from occurring while operating within the vehicular computing environment with limited attention.

A HMD device can improve the operating efficiency a user can encounter within the vehicular computing environment and can be especially helpful during a focus shift. By configuring the VCE to interact with the HMD device, the HMD device can augment a three dimensional (3D) augmented video feed of the live content captured within the central viewing area or the peripheral viewing area with consideration towards focus-limiting-factors. Focus-limiting-factors can include, but are not limited to, the speed of the vehicle (e.g., 60 mph, 75 km/h, etc.), the road condition of the desired pathway (e.g., paved, off-road, number of potholes, etc.), the level of surrounding traffic (e.g., light, medium, heavy, etc.), and the weather (e.g., sun, rain, snow, etc.) affecting the user's ability to navigate the vehicle.

Aspects of the present disclosure relate to machine learning applications, and more specifically, gaze detecting capabilities within the HMD which facilitate detecting when a focus shift has occurred, thus, initiating augmentation. For example, if the user pre-set the threshold limit to reflect a viewing deviation of 60 degrees (left and/or right) off the center mean of the central viewing area, then gaze detecting capabilities can detect when the user's sight angle exceeds the threshold limit at a 61-degree deviation (left and/or right). Thus, at the 61-degree deviation, augmentation within the display interface of the HMD device can occur.

In some embodiments, the HMD device comprises a HMD compass coupled with the gaze detecting technology, capable of identifying the user's directional focus. The vehicular computing environment can additionally include a VCE compass capable of indicating the vehicle's directional orientation. If the HMD compass measurement (e.g., user's directional focus) determines the sight angle deviates beyond the threshold limit from the VCE compass measurement (e.g., vehicle's directional orientation), the HMD can determine a shift in focus. In response to the misaligned measurements, augmentation within the display interface of the HMD device can occur. Augmentation can enable the driver to see live feed content captured within the central viewing area or within the peripheral viewing area.

In some embodiments, if the vehicle is stopped, the live feed content augmentation can automatically stop regardless of the measured sight angle between the user's directional focus and the vehicle's directional orientation. In alternative embodiments, the user can configure continuous augmentation regardless of the vehicle's movement.

In some embodiments, augmentation can commence automatically after the occurrence of a focus shift, and more specifically, at a determination that the measured sight angle deviates beyond the threshold limit. In alternative embodiments, augmentation can commence after a delay when the measured sight angle continues to exceed the threshold limit for a predetermined period. Thus, avoiding augmentation when the user's focus shift occurs only for a short period of time (e.g., one-half second, etc.)

In some embodiments, the HMD device includes a time varying low-pass imaging filter for reducing jerkiness of images resulting from quick head turns/gaze changes. The time varying low-pass imaging filter can be an active filter utilizing cognitive computing technologies to customize the time lag based on a user's reaction times, vision problems, co-passengers (e.g., children), and/or other factors.

In some embodiments, the vehicular computing environment can configure at least one recording mechanism connected between a VCE control system and the HMD device, to record the viewing surroundings for image analysis and information recall.

Augmenting in the display interface with captured live content, during a focus shift, is beneficial, as doing so reduces perturbation of the user's behavior and, in turn, can lead to higher safety and precautionary measures while operating within the vehicular computing environment. The ability to easily enable and disable augmentation can facilitate a variety of control heuristics that allow the user to better recover from focus shifts and safely restore or regain operating focus.

Referring now to FIG. 1, illustrated is a diagrammatic depiction of an example vehicular computing environment (VCE) 100 in which illustrative embodiments of the present disclosure can be implemented. In some embodiments, the VCE 100 can include numerous components communicatively coupled to a VCE control system 105 and/or a network 150 throughout vehicle 102. Components can include, but are not limited to, a plurality of recording devices (e.g., recording device 110, and recording device 115, etc.), a plurality of data sensors (e.g., data sensor 120, data sensor 125, and data sensor 130, etc.), a plurality of compasses (e.g., VCE compass 135, and HMD compass 140, etc.) and a user head mounted display (HMD) device (e.g., HMD device 145).

Vehicle 102 is responsible for housing the numerous components comprised within VCE 100. In embodiments, vehicle 102 can comprise a user operated machine responsible for transporting at least one passenger (e.g., user, etc.). Moreover, the physical representation of vehicle 102 can comprise non-motor vehicles (e.g., bicycle, wagon, etc.), motor vehicles (e.g., car, truck, bus, motorcycle, etc.), railed vehicles (e.g., train, tram, etc.), autonomous vehicles (e.g., self-driving cars, etc.), electric vehicles, watercrafts (e.g., ships, boats, etc.), aircrafts (e.g., airplane, etc.), and spacecrafts (e.g., spaceship, etc.), however, future embodiments are described hereinafter with respect to a car.

Consistent with various embodiments, the VCE control system 105 is an embedded software system responsible for one or more electrical systems or subsystems in vehicle 102. VCE control system 105 can include a processor (not pictured) and memory (not pictured). Similarly, the plurality of recording devices (e.g., recording device 110, and recording device 115, etc.), the plurality of data sensors (e.g., data sensor 120, data sensor 125, and data sensor 130, etc.), the plurality of compasses (e.g., VCE compass 135, and HMD compass 140, etc.) and the user head mounted display (HMD) device 145 can include processors or memory.

Recording devices 110 and 115, data sensors 120, 125, and 130, and the VCE compass 135 can be configured to communicate with each other through an internal or external connection to VCE control system 105. VCE control system 105 can be, in some embodiments, a dashboard display unit or network interface of vehicle 102. Additionally, recording devices 110 and 115, data sensors 120, 125, and 130, and the VCE compass 135 can include optional input devices, and/or any commercially available or custom software.

HMD compass 140 can be configured to communicate with HMD device 145. In embodiments, HMD device 145 can be a display device (e.g., glasses, contacts, visor, etc.) worn on the head or as part of a helmet comprising an optical display interface (e.g., monocular HMD, binocular HMD) with at least one lens and/or at least one semi-transparent mirror embedded in an eye glass (e.g., data glasses). In some embodiments, the HMD can include cathode ray tubes (CRT), liquid crystal displays (LCDs), liquid crystal on silicon (LCos), and/or organic light-emitting diodes (OLED).

The recording devices 110 and 115, data sensors 120, 125, and 130, and the VCE compass 135 can be distant from each other and communicate over VCE control system 105. The HMD compass 140 and HMD device 145 can be configured to communicate directly with each other and can be distant from VCE control system 105. VCE control system 105 and HMD device 145 can be distant from each other and communicate over the network 150. In some embodiments, the VCE control system 105 can be a central hub from which recording devices 110 and 115, data sensors 120, 125, and 130, and VCE compass 135 can establish a communication connection. Alternatively, recording devices 110 and 115, data sensors 120, 125, and 130, and VCE compass 135 can be configured in any other suitable networking relationship (e.g., using any other network topology configuration).

In some embodiments, the network 150 can be implemented using any number of any suitable wire or wireless communications media. For example, the network 150 can be a wide area network (WAN), a local area network (LAN), an internet, or an intranet. In certain embodiments, the recording devices 110 and 115, data sensors 120, 125, and 130, and VCE compass 135 can be local to each other, and communicate via any appropriate local communication medium. For example, the recording devices 110 and 115, data sensors 120, 125, and 130, and VCE compass 135 can communicate using a local area network (LAN), one or more hardwire connections, a wireless link or router, or an intranet. In some embodiments, recording devices 110 and 115, data sensors 120, 125, and 130, and VCE compass 135 can be communicatively coupled using a combination of one or more networks and/or one or more local connections. For example, the first data sensor 120 can be hardwired to the VCE control system 105 (e.g., connected with an Ethernet cable) while the second data sensor 125 can communicate with the VCE control system 105 using the network 150 (e.g., over the Internet).

In some embodiments, the network 150 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The recording devices 110 and 115 can be recording mechanisms configured to record the central viewing area and peripheral viewing area of vehicle 102 during vehicular operations (e.g., driving, etc.). Recording devices within the VCE 100 can comprise manually mounted and/or integrated exterior view (e.g., frontal view, lane view, rear view, etc.) and cabin view (e.g., taxi view, etc.) recording mechanisms (e.g., dashboard camera, rear mounted camera, front mounted camera, etc.) that continuously record (e.g., loop recording, etc.) a 3D video feed of the surrounding vehicle environment throughout navigation. The recording devices 110 and 115 can capture content including, but not limited to, the driving pathway and potential distracting objects within the peripheral environment of vehicle 102. The recorded content can be processed through one or more recording filter (e.g., low pass imaging filter, etc.) and forwarded to the HMD device 145 for augmentation or stored for subsequent analysis and recall. In some embodiments, the recording devices 110 and 115 can store recorded content on memory, and thereafter can transfer the recorded content to VCE control system 105. In some embodiments, the recording devices 110 and 115 can continually transmit content to network 150.

Any number of recording devices 110 and 115 can be implemented. In some embodiments, the number of recording devices can be based on the plurality of objects to be monitored. Recording devices 110 and 115 can be disposed in any suitable location within vehicle 102. In some embodiments, recording devices 110 and 115 can be pre-existing recording mechanisms configured into vehicle 102. In some embodiments, recording devices 110 and 115 can be mounted to vehicle 102. In some embodiments, recording devices 110 and 115 can be embedded in one or more objects. For example, recording devices 110 and 115 can be embedded into the windshield of vehicle 102. In some embodiments, the plurality of cameras can be located throughout the exterior and/or interior of the vehicle and can further be configured to provide a semi-transparent 3D video feed to the HMD of portions around the vehicle (e.g., a blind spot during a lane change).

The data sensors 120, 125, and 130 can be configured to collect dynamic sensor data. The data sensors 120, 125, and 130 can monitor objects (e.g., surrounding vehicles, etc.), surfaces (e.g., road side conditions, etc.), automotive statistics (e.g., speed of the vehicle, etc.) or atmospheric conditions (e.g., weather, etc.) to collect dynamic sensor data throughout the duration of operating vehicle 102. The sensor data can then be analyzed in the VCE control system 105 transferred to HMD device 145. In some embodiments, the data sensors 120, 125, and 130 can store dynamic sensor data on memory, and thereafter can transfer the dynamic sensor data to the VCE control system 105. In some embodiments, the data sensors 120, 125, and 130 can continually transmit dynamic sensor data to the VCE control system 105. Dynamic sensor data can be transmitted to the VCE control system 105 using any suitable technique, including push and pull techniques.

Any number of data sensors 120, 125, and 130 can be implemented. In some embodiments, the number of data sensors can be based on the surrounding vehicles and number of objects (e.g., pedestrians, pot holes, traffic cones, etc.) to be monitored. For example, operating vehicle 102 in a densely populated city may require double the number of data sensors 120, 125, and 130 because of the high concentration of surrounding vehicles and/or objects near operating vehicle 102. In some embodiments, the number of data sensors 120, 125, and 130 can depend on the objects being monitored. In some embodiments, the number of data sensors 120, 125, and 130 can depend on safety standards.

In some embodiments, data sensors 120, 125, and 130 can be similar or dissimilar data sensors designed for measuring vehicular data. In some embodiments, data sensors 120, 125, and 130 can include atmospheric sensors, designed for measuring the atmospheric conditions in the air. In some embodiments, data sensors 120, 125, and 130 can include velocity, acceleration, and pressure sensors. In some embodiments, data sensors 120, 125, and 130 can include vibration, movement, and global positioning system (GPS) sensors. In some embodiments, varying types of sensors can be integrated into a single sensor (e.g., a combined accelerometer/movement sensor).

The number and placement of the data sensors 120, 125, and 130 can depend on the type of sensor. Data sensors 120, 125, and 130 can be disposed in any suitable location within vehicle 102. In some embodiments, data sensors 120, 125, and 130 can be pre-existing sensors configured into vehicle 102. In some embodiments, data sensors 120, 125, and 130 can be mounted to vehicle 102. In some embodiments, data sensors 120, 125, and 130 can be embedded in one or more objects. For example, data sensors 120, 125, and 130 can be embedded on a server, a wheel, a windshield, a frame of a vehicle, or a different component of a vehicle as shown in the drawings. In some embodiments, data sensors 120, 125, and 130 can be evenly distributed based on sensing range requirements. For example, data sensors 120, 125, and 130 can be spaced equidistant from each other. In some embodiments, data sensors 120, 125, and 130 can be stationary. In some embodiments where the data sensors 120, 125, and 130 are stationary, the data sensors 120, 125, and 130 can be fixed in a specific location.

Dynamic sensor data can be collected in any suitable manner. In some embodiments, multiple data sensors can be used to monitor the same object, and the multiple measurements can be combined (e.g., averaged) or considered separately. Further, dynamic sensor data can include historical data, which can be combined into a single value (e.g., rate, acceleration).

For the benefit of vehicular orientation, the VCE compass 135 can comprise a directional integrated circuit (e.g., hall sensor, Anisotropic, magnetoresistance (AMR), giant magnetoresistance (GMR), etc.) within vehicle 102 to measure the Earth's magnetic field strength and compute a multi-axis (e.g., 2-axis, 3-axis, etc.) representation. Combined with at least a first data sensor (similar to data sensor 120, 125, or 130, etc.) (e.g., accelerator), the VCE compass 135 acquires information regarding the vehicle's position in space. Using GPS capabilities, the VCE compass 135 can be implemented to determine the directional orientation (e.g., north, south, east, west, etc.) vehicle 102 is operating in with respect to the desired driving pathway.

After the set of recorded content, sensor data, and vehicular orientation is received from recording devices 110 and 115, data sensors 120, 125, and 130, and VCE compass 135, the set of obtained data (e.g., captured, recorded, sensed, calculated, etc.) can be analyzed by the VCE control system 105. The VCE control system 105 can, in some embodiments, transfer the set of analyzed data to network 150.

Similarly, the HMD compass 140 within HMD device 145 is responsible for detecting if a focus shift beyond a threshold limit has occurred. A focus shift occurs at the horizon point of the user's eye movement, moving beyond the plane of sight comprising the orientated driving pathway.

HMD compass 140 can be placed in any suitable location. In some embodiments, HMD compass can be centrally located on HMD device 145, to minimize the time required to deploy optical tracking, or located directly on the HMD device interface (e.g., glasses) (not pictured). In some embodiments, conventional eye-attached tracking methods can be deployed by HMD compass 140. In some embodiments, non-contact optical tracking methods can be deployed by HMD compass 140. HMD compass 140 can monitor the gaze of the user, and more specifically, determine when the measured sight angle of the user exceeds the threshold limit.

When HMD compass 140 identifies a focus shift comprising the measured sight angle beyond the threshold limit (e.g., set by the user), the HMD device 145 can interact with the captured content transferred in network 150 and augment, within the display interface of HMD device 145, the recorded content captured within the central viewing area. In embodiments, when the user's driving attention is restored (e.g., an updated measured sight angle is within the threshold limit), the augmentation of the HMD device interface pauses. In doing so, the VCE 100 prioritizes the safety of the user and augments the oriented driving pathway during a focus shift.

It is noted that FIG. 1 is intended to depict the representative major components of an exemplary vehicular computing environment 100. In some embodiments, however, individual components can have greater or lesser complexity than as represented in FIG. 1, components other than or in addition to those shown in FIG. 1 can be present, and the number, type, and configuration of such components can vary.

Figure 2:
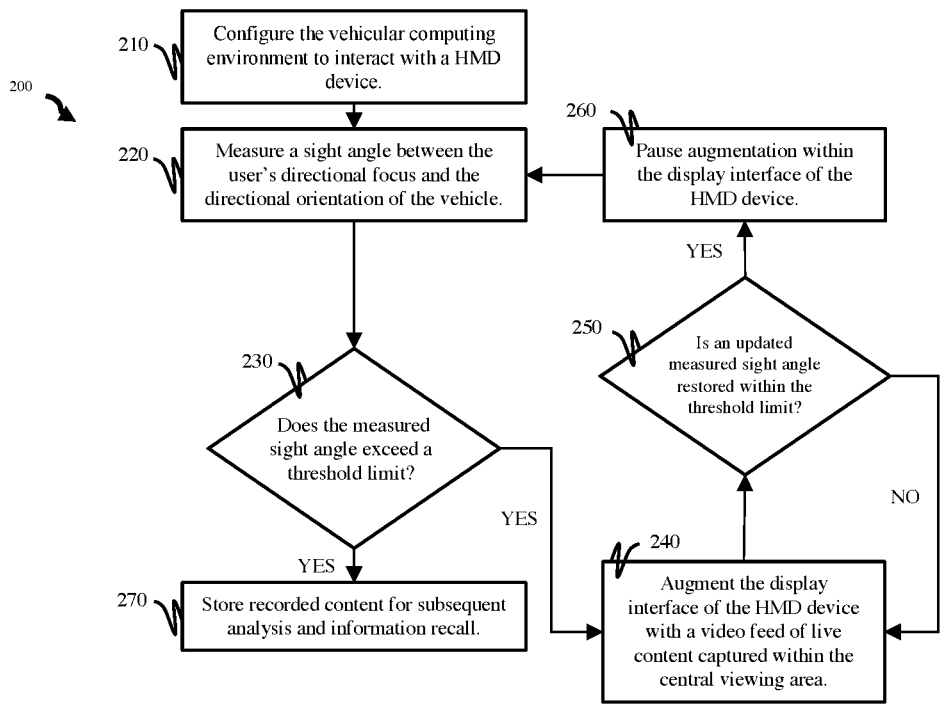
FIG. 2 is a flow diagram illustrating an example method for augmenting a display interface of a user's HMD device in response to a determination that a measured sight angle exceeds a threshold limit, in accordance with embodiments of the present disclosure.

Referring now to FIG. 2, illustrated is an example method 200 for augmenting a display interface of a user's HMD device, in response to a sight angle exceeding a threshold limit, in accordance with embodiments of the present disclosure. The method 200 can be performed by, for example, one or more processors, a software system (e.g., VCE control system 105 of FIG. 1), or a different configuration of software and/or hardware. For clarity, the method 200 will be described as being performed by the VCE control system, however, aspects of the present disclosure can be performed by other software components or combinations of software components. In embodiments, the method 200 uses the VCE control system to augment the display interface of the user operated HMD device with a live feed content captured by a plurality of components comprised within the VCE. In some embodiments, aspects of the method 200 are consistent with vehicular computing environment 100 of FIG. 1. However, it is to be understood that the various operations of FIG. 2 are presented by way of example and are not limited to such.

Components performing the operations within the method 200 can communicate independently with each other and further identify focus-limiting-factors. Focus-limiting-factors can inhibit the user's ability to operate a vehicle (e.g., vehicle 102 of FIG. 1). Focus-limiting-factors can include, but are not limited to, the speed of the vehicle (e.g., 60 mph, 75 km/h, etc.), the road condition of the desired pathway (e.g., paved, off-road, number of potholes, etc.), the level of surrounding traffic (e.g., light, medium, heavy, etc.), and the weather (e.g., sun, rain, snow, etc.) affecting the user's ability to navigate the vehicle.

In some embodiments, focus-limiting-factors can be based on one or more counts of information. That is to say, in some embodiments, the combination of psychological tendencies (e.g., the attention span of the user, etc.) and the prevalence of roadside distractions (e.g., billboard content, road side activity, road signs, etc.) or the prevalence of a second user (e.g., passenger), can result in a focus shift.

In operation 210, the vehicular computing environment is configured to interact with the HMD device (e.g., HMD device 145 of FIG. 1). In some embodiments, the HMD device can be display glasses worn on the head of the user, comprising semi-transparent lenses embedded with gaze detecting software and an optical display interface configured to project augmented reality.

In embodiments, a plurality of recording devices can be enabled (e.g., turned on), at vehicle ignition, to record the directional path and the surrounding environment of the operating vehicle. In embodiments, the directional path can comprise the driving route. In some implementations, a first recording device (e.g., recording device 110 of FIG. 1) can be a front facing camera responsible for capturing, in real-time, a feed of the content (e.g., cars, pedestrians, etc.) within a central viewing area. In alternative implementations, a second recording device (e.g., recording device 115 of FIG. 1) can be a side facing camera responsible for capturing, in real-time, a feed of the content (e.g., cars, billboards, etc.) within a peripheral viewing area.

Throughout the duration of vehicular operations (e.g., driving, etc.), each content feed captured within the central viewing area and/or the peripheral viewing area can be digitally transferred to the VCE control system for processing and future content analysis.

In embodiments, a plurality of data sensors (e.g., data sensors 120, 125, and 130 of FIG. 1) can further be enabled, at vehicle ignition, to monitor hazards in the environment surrounding the vehicle. The sensitivity of each data sensor comprised within the plurality of sensors can be configured to detect light, motion, temperature, sound, position, moisture, orientation, and levelness to name a few. Similar to the plurality of recording devices, changes and hazards sensed by at least a first data sensor can be digitally transferred to the VCE control system for data processing and future content analysis.

In embodiments, a digital transfer is the physical transfer of data (e.g., a digital bit video stream, a digitized analog sensor signal, etc.) over a point-to-point or point-to-multi-point communication channel.

In some implementations, the plurality of recording devices and the plurality of data sensors can detect and record information relating to the same hazard (e.g., road side car, etc.). In embodiments, a hazard comprises an object requiring the user's directional focus to be shifted in order to view the object in a perpendicular perspective. In such embodiments, the digital content transferred from the respective components can be stored in a shared memory file within the VCE control system (e.g., road side car file).

In some implementations, the plurality of recording devices and the plurality of data sensors can detect and record information relating to different hazards (e.g., road side car, billboard, etc.). In such embodiments, the digital content transferred from at least the first recording device and at least the first data sensor can be stored in a separate memory file within the VCE control system (e.g., road side car file, billboard file), respectively.

In some implementations, the HMD device can gather driving directions from the vehicle and further determine if a sight angle between the user's directional focus and the vehicle's directional orientation deviates beyond the threshold limit.

Operating within an idle position, at block 220, the sight angle between the directional plane of sight for the user (user's directional focus) and the operating directional path of the vehicle (vehicle's directional orientation) can be measured. Using gaze tracking capabilities within the HMD device, the HMD compass (e.g., HMD compass 140 of FIG. 1) can determine an initial measurement for the user's directional focus (e.g., line of sight).

Similarly, a vehicular compass (e.g., VCE compass 135 of FIG. 1) can determine an initial measurement for the vehicle's directional orientation. In implementations, the initial directional orientation measurement can comprise the navigational direction (e.g., North, 0 degrees, etc.) the front of the car faces, relative to the vehicle's position in space.

Ideally, in an idle position, the user's directional focus and the vehicle's directional orientation are aligned. In embodiments, a deviation between the user's directional focus and the vehicle's directional orientation can be referred as the user's sight angle and can further be used to indicate the occurrence of a focus shift. The deviation at which the sight angle comprises can be compared against the pre-set or user configured threshold limit to determine a focus shift occurrence. More specifically, the deviation between the sight angle and the threshold limit can be used to determine which viewing area (e.g., central viewing area, peripheral viewing area) to augment into the display interface of the HMD device.

Throughout vehicular operations, the HMD device gathers driving directions from the vehicle and, with the VCE control system, continually monitors if the sight angle of the user's directional focus is within the pre-set deviation of the threshold limit. Such implementations can consider the variable height the user can experience throughout the duration of vehicular operations, and can further determine, with the HMD compass, a focus shift.

Coupled with the data collected from the plurality of data sensors (e.g., speed of vehicle, road conditions, traffic conditions, etc.), a set of cognitive computing capabilities within the software embedded throughout the HMD device and VCE control system determine, at decision 230, if the measured sight angle exceeds the threshold limit.

In embodiments, the measured sight angle (measured in operation 220) is within the threshold limit when the angular deviation of the user's directional focus deviates from the vehicle's directional orientation less than the pre-determined angular threshold limit. Alternatively, however, the measured sight angle (measured in operation 220) exceeds the threshold limit when the angular deviation of the user's directional focus deviates from the vehicle's directional orientation more than the pre-determined angular threshold limit. In such embodiments of the sight angle exceeding the threshold limit, the user's directional focus is considered to reside in the peripheral viewing area.

In response to a determination at decision 230 that the measured sight angle exceeds the threshold limit, the VCE control system transmits a video feed of continuous live content captured within the central viewing area across the network and augments it into the display interface of the HMD device at operation 240. Accordingly, in real time, the content captured within the central viewing area is processed and transparently projected in a format conducive to pixel optimization and viewing.

Throughout vehicular operations, the HMD device will continuously determine, at decision 250, if an updated measured sight angle has been restored within the threshold limit, thus signifying a driver has restored attention. In embodiments, the updated measured sight angle can be determined by continually measuring at a plurality of incremental time periods, the deviation of the measured sight angle. Additionally, the updated measured sight angle can comprise the measured sight angle (measured in operation 220) restoring to a deviation acceptable for satisfying the angular deviation of the threshold limit.

In embodiments, in response to a determination that the threshold limit is not restored, (signifying the updated measured sight angle still exceeds the threshold limit), the display interface of the HMD device will continue to be augmented with the video feed of continuous live content captured within the central viewing area. Alternatively, however, in response to a determination that the updated measured sight angle is restored within the threshold limit, augmentation within the interface of the HMD device of the video feed comprising live content captured within the central viewing area is paused in operation 260 and the method 200 returns to operation 220.

After vehicular operations, in operation 270, the video feed of continuous live content captured within the central viewing area is stored for subsequent analysis and information recall.

In some implementations, when the vehicle is stopped, regardless of the measured sight angle, the user can configure the HMD device to stop augmenting the display interface of the HMD device with the video feed comprising live content. In alternative implementations, however, the user can configure the HMD device to continuously augment the display interface of the HMD device when the vehicle is stopped.

To account for lag due to the persistence of focus shifts, the video feed comprising live content can be adjusted with a slow lag or hysteresis such that the user is not distracted further during uneven terrain or jerky variation of images. In some embodiments, the lag is applied by a time varying low pass imaging filter. The low pass imaging filter can be an active filter that is created based on cognitive learning capabilities that depends on tendencies and the response time of the user.

It is noted that FIG. 2 is intended to depict the representative operations of an example method 200 for augmenting the display interface of a user's HMD device in response to the sight angle exceeding the threshold limit. In some embodiments, however, individual operations can have greater or lesser complexity than as represented in FIG. 2, operations other than or in addition to those shown in FIG. 2 can be present, and the number, type, and configuration of such operations can vary.

Figure 3:
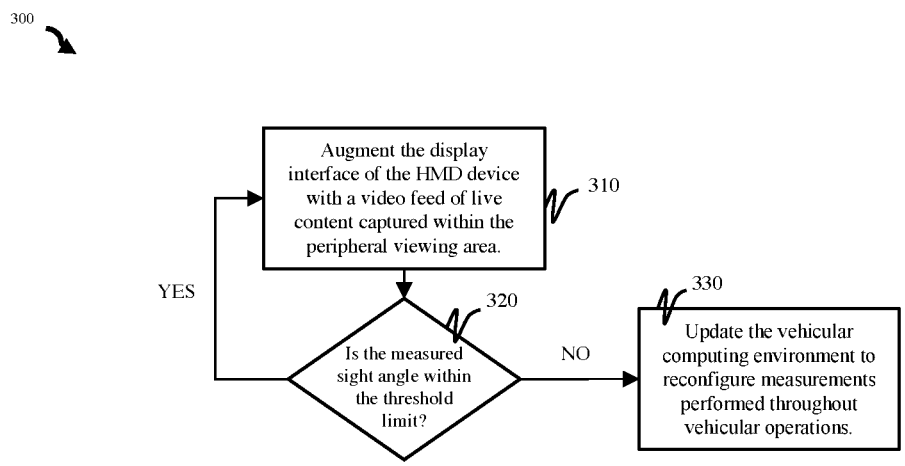
FIG. 3 is a flow diagram illustrating an example method for augmenting a display interface of user's HMD device in response to a determination that a measured sight angle is within a threshold limit, in accordance with embodiments of the present disclosure.

Referring now to FIG. 3, illustrated is an example method 300 for augmenting the display interface of a user's HMD device in response to determination that a measured sight angle is within a threshold limit, in accordance with embodiments of the present disclosure. The method 300 can be performed by, for example, one or more processors, a software system (e.g., VCE control system 105 of FIG. 1), or a different configuration of software and/or hardware. For clarity, the method 300 will be described as being performed by the VCE control system, however, aspects of the present disclosure can be performed by other components or combinations of components. In embodiments, the method 300 uses the VCE control system to augment the display interface to the user's HMD device with a video feed of continuous live content captured within a peripheral viewing area. In some embodiments, aspects of the method 300 are consistent with vehicular computing environment 100 of FIG. 1. However, it is to be understood in embodiments, that various operations are presented by way of example and are not limited to such. The method 300 can be a sub-method based on a determination that the threshold limit validates the central viewing area at decision block 230 of FIG. 2.

In embodiments, operation 310 occurs in response to a determination at decision block 230 of FIG. 2, that the measured sight angle does not exceed the threshold limit. At operation 310, it is confirmed that the measured sight angle does not exceed the threshold limit and similar to operation 240 of FIG. 2, a video feed of continuous live content captured within the peripheral viewing area is transferred across the network and augmented into the display interface of the HMD device. Accordingly, in real time, the live content captured within the peripheral viewing area is processed and transparently projected in a format conducive to pixel optimization and viewing.

Throughout vehicular operations, the HMD device can continuously (e.g., at each 1 second time interval) determine (similar to operation 230 of FIG. 2), at decision 320, if the measured sight angle is within the threshold limit.

In response to a determination that the measured sight angle is still within the threshold limit, further indicating a focus shift has not occurred, (the measured sight angle does not exceed the threshold limit), the augmented display interface of the HMD device will continue to project the video feed of live content captured within the peripheral viewing area, as in operation 310. Alternatively, however, if it is determined that a focus shift has occurred and the measured sight angle is no longer within the threshold limit (the measured sight angle exceeds the threshold limit), at operation 330, the VCE control system and the HMD device continuously update the vehicular computing environment to reconfigure measurements and further determine which viewing area (e.g., central viewing area, peripheral viewing area) to augment into the display interface of the HMD device.

Similar to operation 270 of FIG. 2, after vehicular operations, the video feed of continuous live content captured within the peripheral viewing area can be stored for subsequent analysis and information recall.

It is noted that FIG. 3 is intended to depict the representative operations of an example method 300 for augmenting the display interface of a user's HMD device, in response to a determination that the measured sight angle is within the threshold limit. In some embodiments, however, individual operations can have greater or lesser complexity than as represented in FIG. 3, operations other than or in addition to those shown in FIG. 3 can be present, and the number, type, and configuration of such operations can vary.

FIG. 4 is a diagrammatic depiction illustrating embodiments with an example display interface 440 of a HMD device being augmented when a measured sight angle 450 exceeds a threshold limit degree 460. Specifically, FIG. 4 comprises recording device 405, user operated vehicle 410, surrounding traffic 415, vehicle's directional orientation 420, user's directional focus 425, central viewing area 430, focus-limiting-factor 435, display interface 440, road 445, measured sight angle 450, and threshold limit degree 460.

Accordingly, the vehicle's directional orientation 420 for the user operated vehicle 410 is positioned within the center of the central viewing area 430. Moreover, throughout vehicular operations, the recording device 405 captures a video feed with respect to the vehicle's directional orientation 420 of user operated vehicle 410, and more specifically, a video feed of continuous live content comprised within the central viewing area 430.

For illustrative purposes, the threshold limit degree 460 can be pre-determined and comprise the angle up to the boundary of central viewing area 430. However, in embodiments, the threshold limit degree 460 is presented by way of example and is not limited to such configuration.

In embodiments, measured sight angle 450 is the measurement between the vehicle's directional orientation 420 and the user's directional focus 425. In embodiments, focus-limiting factor 435 (e.g., billboard, etc.) is positioned outside central viewing area 430 beyond threshold limit 455. When the user's directional focus 425 is in line with focus-limiting factor 435, it is determined that the sight angle 450 exceeds the threshold limit degree 460. For example, if the measured sight angle 450 is measured to be 50 degrees and a threshold limit of 40 degrees is set at threshold limit degrees 460, then a focus shift has occurred. As such, the video feed of continuous live content comprised within the center viewing area 430, captured by recording device 405, is uploaded through a VCE control system (not pictured) and augmented into the display interface 440 of the HMD device. As a result, the surrounding traffic 415 within the central viewing area 430 can be observed in the HMD device when the measured sight angle 450 exceeds the threshold limit degree 460.

It is noted that FIG. 4 is intended to depict the representative components of some example embodiments. In some embodiments, however, individual components can have greater or lesser complexity than as represented in FIG. 4, components other than or in addition to those shown in FIG. 4 can be present, and the number, type, and configuration of such components can vary.

FIG. 5 is a diagrammatic depiction illustrating embodiments with an example display interface 540 of a HMD device being augmented when a measured sight angle 555 is within a threshold limit degree 560. Specifically, FIG. 5 comprises recording device 505, user operated vehicle 510, surrounding traffic 515, vehicle's directional orientation 520, user's directional focus 525, central viewing area 530, focus-limiting factor 535, display interface 540, road 545, peripheral viewing area 550, measured sight angle 555, and threshold limit degree 560.

Accordingly, the vehicle's directional orientation 520 for the user operated vehicle 510 is positioned within the center of the central viewing area 530. Moreover, throughout vehicular operations, the user's directional focus 525 is positioned within the threshold limit degree 560.

For illustrative purposes, a threshold limit at the threshold limit degree 560 can be pre-determined and comprise the boundary of central viewing area 530. However, in embodiments, the threshold limit degree 560 is presented by way of example and is not limited to such configuration.

To mitigate the need for a focus shift and for subsequent information recall, the recording device 505 captures a video feed with respect to hazards exceeding the central viewing area 530, and more specifically, a video feed of continuous live content comprised within the peripheral viewing area 550. In embodiments, focus-limiting 535 (e.g., billboard, etc.) is positioned within peripheral viewing area 550. For illustrative purposes, the peripheral viewing area 550 independently comprises an area of view beyond the central viewing area 530. However, in embodiments, the peripheral viewing area 550 is not limited to such configuration and can overlap into the central viewing area 530 and/or exists at the threshold limit degree 560 boundary of the central viewing area 530.

In embodiments, the measured sight angle 555 is the measurement between the vehicle's directional orientation 520 and the user's directional focus 525. When the user's directional focus 525 does not deviate beyond the threshold limit at the threshold limit degree 560 (e.g., the measured sight angle 555 is not oriented within peripheral viewing area 550), it is determined that the measured sight angle 555 is within the threshold limit degree 560. As such, a video feed of continuous live content captured within the peripheral viewing area 550 (comprising focus-limiting-factor 535), captured by recording device 505, is uploaded through a VCE control system (not pictured) and augmented into the display interface 540 of the HMD device. Thus, the focus-limiting-factor 535 within the peripheral viewing area 550 can be observed in the HMD device display interface 540 when the sight angle 555 is within the threshold limit degree 560.

It is noted that FIG. 5 is intended to depict the representative components of some example embodiments. In some embodiments, however, individual components can have greater or lesser complexity than as represented in FIG. 5, components other than or in addition to those shown in FIG. 5 can be present, and the number, type, and configuration of such components can vary.

Figure 6:
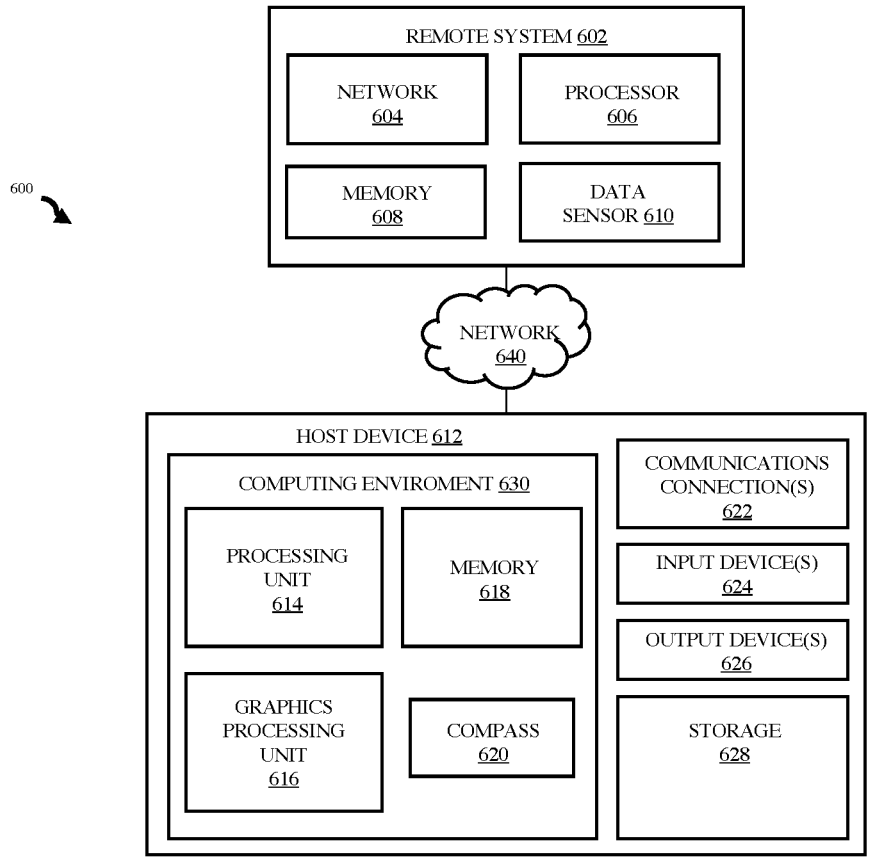
FIG. 6 is a block diagram illustrating an example computer environment, in accordance with embodiments of the present disclosure.

FIG. 6 depicts a block diagram of an example computing environment 600 in which embodiments of the present disclosure can be implemented. In some embodiments, aspects of computing environment 600 can perform the methods described in one or more of FIGS. 2-3. As shown in FIG. 6, the computing environment 600 includes a remote system 602 and a host device 612.

According to embodiments, the host device 612 and the remote system 602 can be computer systems. The remote system 602 and the host device 612 can include one or more processors 606 and 614 and one or more memories 608 and 618, respectively. The remote system 602 and the host device 612 can be configured to communicate with each other through an internal or external network interface 604 and communications connection(s) 622 (e.g., modems or interface cards). The remote system 602 and/or the host device 612 can be equipped with a display or monitor. Additionally, the remote system 602 and/or the host device 612 can include optional input devices (e.g., a scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote system 602 can be similar to VCE control system 105 and host device 612 can be similar to HMD device 145 of FIG. 1.

The remote system 602 and the host device 612 can be distant from each other and can communicate over a network 640. In embodiments, the host device 612 can be a central hub from which a remote system 602 and other remote devices (not pictured) can establish a communication connection, such as in a client-server networking model. In some embodiments, the host device 612 and remote system 602 can be configured in any other suitable network relationship (e.g., in a peer-to-peer configuration or using another network topology).

In embodiments, the network 640 can be implemented using any number of any suitable communications media. For example, the network 640 can be a wide area network (WAN), a local area network (LAN), the Internet, or an intranet. In certain embodiments, the remote system 602 and the host device 612 can be local to each other, and communicate via any appropriate local communication medium. For example, the remote system 602 and the host device 612 can communicate using a local area network (LAN), one or more hardwire connections, a wireless link or router, or an intranet. In some embodiments, the remote system, the host device 612, and any other devices can be communicatively coupled using a combination of one or more networks and/or one or more local connections. For example, the remote system 602 can be hardwired to the host device 612 while a second device (not pictured) can communicate with the host device using the network 640.

In some embodiments, the network 640 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 640.

In some embodiments, the host device 612 can include input device(s) 624 and output device(s) 626. The host device 612 can contain subcomponents, such as a computing environment 630. The computing environment 630 can include a processing unit 614, a graphics processing unit 616, a memory 618, and a compass 620. In embodiments, compass 620 can be configured to perform at least part of one or more of methods, 200, and/or 300 discussed above. The computing environment 630 can be configured to perform processing to augment recording content collected form data sensor 610 from remote system 602. The storage 628 can be configured to store recorded content for information analysis and recall.

While FIG. 6 illustrates a computing environment 600 with a single host device 612 and a single remote system 602, suitable computing environments for implementing embodiments of this disclosure can include any number of remote devices and host devices. The various models, modules, systems, instructions, and components illustrated in FIG. 6 can exist, if at all, across a plurality of host devices and remote devices.

It is noted that FIG. 6 is intended to depict representative components of an example computing environment 600. In some embodiments, however, individual components can have greater or lesser complexity than as represented in FIG. 6, components other than or in addition to those shown in FIG. 6 can be present, and the number, type, and configuration of such components can vary.

Figure 7:
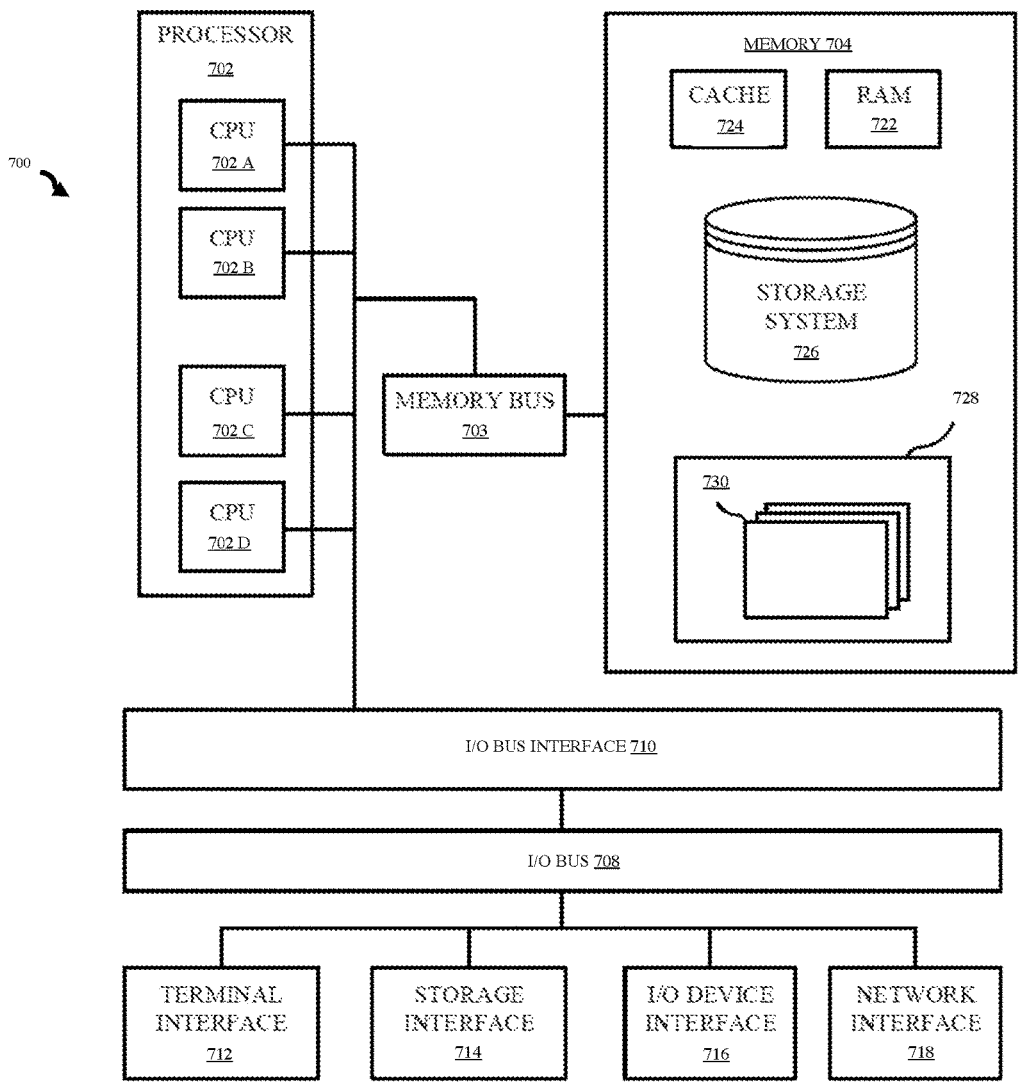
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 700 that can be used in implementing one or more of the methods, tools, and modules, and any related functions, described herein (e.g., using one or more processor circuits or computer processors of the computer), in accordance with embodiments of the present disclosure. In some embodiments, the major components of the computer system 700 can comprise one or more CPUs 702, a memory subsystem 704, a terminal interface 712, a storage interface 714, an I/O (Input/Output) device interface 716, and a network interface 718, all of which can be communicatively coupled, directly or indirectly, for inter-component communication via a memory bus 703, an I/O bus 708, and an I/O bus interface unit 710.

The computer system 700 can contain one or more general-purpose programmable central processing units (CPUs) 702A, 702B, 702C, and 702D, herein generically referred to as the CPU 702. In some embodiments, the computer system 700 can contain multiple processors typical of a relatively large system; however, in other embodiments the computer system 700 can alternatively be a single CPU system. Each CPU 702 can augment video content stored in the memory subsystem 704 and can include one or more levels of on-board cache.

System memory 704 can include computer system readable media in the form of volatile memory, such as random access memory (RAM) 722 or cache memory 724. Computer system 700 can further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 can include at least one program product having a set (e.g., at least one) of program modules that are configured to carry out the functions of various embodiments.

One or more programs/utilities 728, each having at least one set of program modules 730 can be stored in memory 704. The programs/utilities 728 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 728 and/or program modules 730 generally perform the functions or methodologies of the various embodiments discussed above. For example, in some embodiments, the program modules 730 of the computer system 700 include augmentation.

Although the memory bus 703 is shown in FIG. 7 as a single bus structure providing a direct communication path among the CPUs 702, the memory subsystem 704, and the I/O bus interface 710, the memory bus 703 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 700 can, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices can be connected directly to one or more system I/O buses.

In some embodiments, the computer system 700 can be a multi-user mainframe computer system, a single-user system, or a server computer or similar device that has little or no direct user interface, but receives requests from other computer systems (clients). Further, in some embodiments, the computer system 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict representative components of an exemplary computer system 700. In some embodiments, however, individual components can have greater or lesser complexity than as represented in FIG. 7, components other than or in addition to those shown in FIG. 7 can be present, and the number, type, and configuration of such components can vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
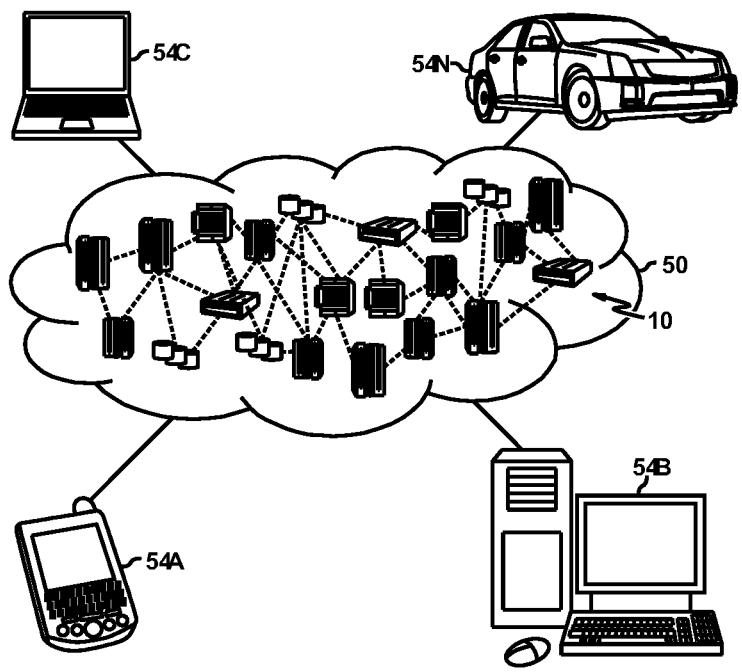
FIG. 8 depicts a cloud computing environment according to some embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
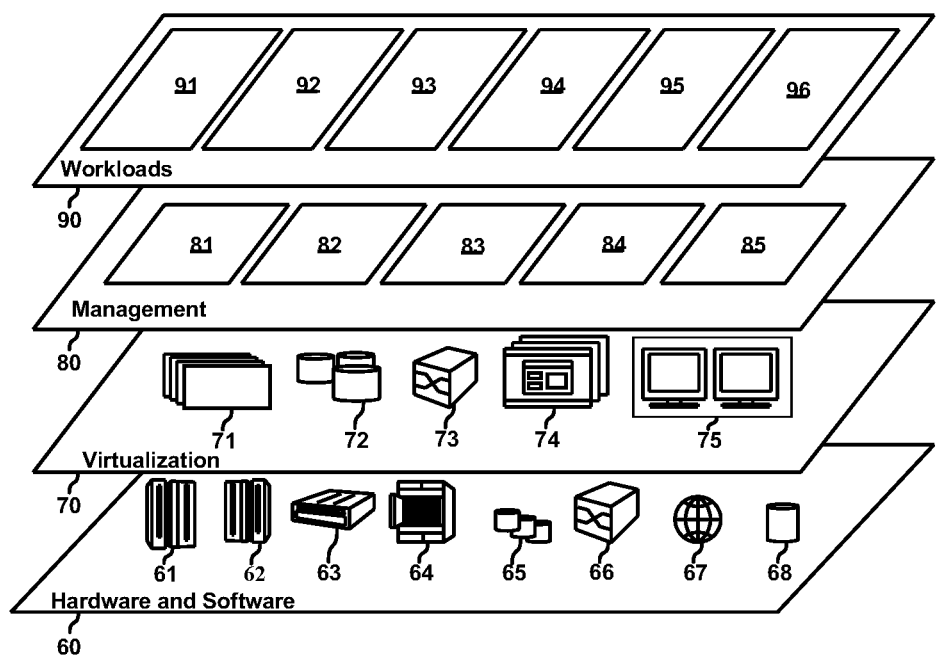
FIG. 9 depicts abstraction model layers according to some embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and augmentation 96.

Embodiments of the present invention can be a system, a method, and/or a computer program product at any possible technical detail level of integration. The computer program product can include a computer readable storage medium (or media having computer readable program instructions thereon for causing the processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

As discussed in more detail herein, it is contemplated that some or all of the operations of some of the embodiments of methods described herein can be performed in alternative orders or can not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure can not be necessary. The previous detailed description is, therefore, not to be taken in a limiting sense.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for augmenting video to a head mounted display (HMD) device worn by a user in a vehicular computing environment (VCE), the method comprising:
    measuring, within the VCE, a sight angle between a user's directional focus and a vehicle's directional orientation;
    measuring, at a plurality of incremental time periods throughout vehicular operations, the user's directional focus;
    augmenting, in response to a determination that the measured sight angle exceeds a threshold limit, an interface of the HMD device with a video feed of continuous live content captured within a central viewing area;
    augmenting, in response to a determination that the measured sight angle is within the threshold limit, the interface of the HMD device with a video feed of continuous live content captured within a peripheral viewing area, wherein the peripheral viewing area extends the central viewing area;
    pausing, in response to a determination that an updated measured sight angle is within the threshold limit, the augmenting; and
    storing, during vehicular operations, any one of the video feed of continuous live content captured within the central viewing area and the video feed of continuous live content captured within the peripheral viewing area for subsequent analysis and recall.

2. The method of claim 1, wherein the central viewing area is determined based on the vehicle's directional orientation.

3. The method of claim 1, wherein the augmenting commences after a delay.

4. A system comprising:
    a head mounted display (HMD) device worn by a user in a vehicular computing environment (VCE);
    a computer readable storage medium storing a corpus of data;
    a user interface configured to receive input and present output; and
    a processor communicatively coupled to the computer readable storage medium and the user interface and having a memory comprising instructions, which, when executed by the processor, cause the processor to perform a method comprising:
        measuring, within the VCE, a sight angle between a user's directional focus and a vehicle's directional orientation;

measuring, at a plurality of incremental time periods throughout vehicular operations, the user's directional focus;

augmenting, in response to a determination that the measured sight angle exceeds a threshold limit, an interface of the HMD device with a video feed of continuous live content captured within a central viewing area;

augmenting, in response to a determination that the measured sight angle is within the threshold limit, the interface of the HMD device with a video feed of continuous live content captured within a peripheral viewing area, wherein the peripheral viewing area extends the central viewing area;

pausing, in response to a determination that an updated measured sight angle is within the threshold limit, the augmenting; and storing, during vehicular operations, any one of the video feed of continuous live content captured within the central viewing area and the video feed of continuous live content captured within the peripheral viewing area for subsequent analysis and recall.

5. The system of claim 4, wherein the central viewing area is determined based on the vehicle's directional orientation.

6. A computer program product for augmenting video to a head mounted display (HMD) device worn by a user in a vehicular computing environment (VCE), the computer program product comprising a computer readable storage medium having program instructions embodied therewith, the program instructions executable by a processor to cause the processor to perform a method comprising:

measuring, within the VCE, a sight angle between a user's directional focus and a vehicle's directional orientation;

measuring, at a plurality of incremental time periods throughout vehicular operations, the user's directional focus;

augmenting, in response to a determination that the measured sight angle exceeds a threshold limit, an interface of the HMD device with a video feed of continuous live content captured within a central viewing area;

augmenting, in response to a determination that the measured sight angle is within the threshold limit, the interface of the HMD device with a video feed of continuous live content captured within a peripheral viewing area, wherein the peripheral viewing area extends the central viewing area;

pausing, in response to a determination that an updated measured sight angle is within the threshold limit, the augmenting; and storing, during vehicular operations, any one of the video feed of continuous live content captured within the central viewing area and the video feed of continuous live content captured within the peripheral viewing area for subsequent analysis and recall.

7. The computer program product of claim 6, wherein the central viewing area is determined based on the vehicle's directional orientation.

* * * * *